United States Patent Office 3,142,662
Patented July 28, 1964

3,142,662
MODIFIED POLYAMIDES CONTAINING THE BENZENESULFONATE MOIETY
William A. H. Huffman, Decatur, Ala., assignor, by mesne assignments, to Monsanto Company, a corporation of Delaware
No Drawing. Filed Oct. 19, 1959, Ser. No. 847,105
13 Claims. (Cl. 260—78)

This invention relates to polymeric materials, and more particularly to fiber-forming polyamides having an improved receptivity for basic dyestuffs.

The polymeric substances with which this invention is concerned are synthetic, high molecular weight, fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity, and insolubility in most solvents except mineral acids, formic acid, and the phenols. Upon hydrolysis with strong mineral acids, the polymers revert to the reactants from which they were formed.

The polyamides of this type can be prepared by the self-polymerization of a monoaminomonocarboxylic acid or by heating substantially equimolecular proportions of a diamine with a dibasic carboxylic acid until the product has polymerized to the fiber-forming stage, which stage is not generally reached until the polyamide has an intrinsic viscosity of at least 0.4, the intrinsic viscosity being defined as $$\frac{\log_e N_r}{C}$$

in which $N_r$ is the relative viscosity of a dilute solution of the polymer in m-cresol in the same units and at the same temperature, and $C$ is the concentration in grams of polymer per 100 cc. of solution. The polymers thus obtained have high melting points and can be cold drawn to form strong, highly oriented fibers.

Amino acids which can be self-polymerized to yield these polymers are represented by the general formula R—NH—R'—COOH in which R is a univalent organic radical or hydrogen and R' is a divalent hydrocarbon radical having a chain length of at least five carbon atoms. Illustrative examples are 6-aminocaproic acid, 9-aminononanoic acid, 11-aminoundecanoic acid and 17-aminoheptadecanoic acid.

Diamines which can be condensed with equimolecular proportions of an appropriate dibasic carboxylic acid to yield fiber-forming polyamides may be represented by the general formula $NH_2CH_{2n}NH_2$ in which $n$ is an integer of 2 or greater and preferably from 2 to 8. Suitable examples are ethylene-diamine, propylenediamine, tetramethylenediamine, pentamethylenediamine, hexamethylenediamine, octamethylenediamine and decamethylenediamine.

Suitable dibasic carboxylic acid reactants are represented by the general formula HOOCRCOOH in which R is a divalent hydrocarbon radical having a chain length of at least two carbon atoms. These materials are illustrated by sebacic acid, octadecanedioic acid, adipic acid, suberic acid, azelaic acid, undecanedoic acid, glutaric acid, pimelic acid, brassylic acid and tetradecanedioic acid.

In place of the above-noted amino acids, dibasic carboxylic acids and diamines, the amide-forming derivatives thereof can be employed to form fiber-forming polymers. Amide-forming derivatives of the amino acids include the ester, anhydride, amide, lactam, acid halide, N-formyl derivative, carbamate, and, in the presence of water, the nitrile. Amide-forming derivatives of the diamines include the carbamate, and N-formyl derivative. Amide-forming derivatives of the dibasic carboxylic acids comprise the mono- and di-ester, the anhydride, the mono- and di-amide, and the acid halide.

The fiber-forming polyamides can be converted into very useful fibers, among other methods, by melt spinning, i.e., by extruding the molten polymer through small orifices, e.g., a spinneret, and then cold-drawing, that is drawing at a temperature below the melting point of the polymer or stretching the resultant filaments until they show fiber orientation. At the temperatures required to spin such polyamides in the molten state (generally 10° to 50° C. above their melting points), they tend to undergo further polymerization. This further polymerization makes it difficult to prepare uniform filaments from the polymer as the filaments first extruded are of a lower molecular weight than those extruded near the end of the spinning operation.

In order to overcome this difficulty of non-uniform polymerization, it has been a common practice to use a small excess (generally 0.1 to 5 molar percent) of either the diamine or the dibasic carboxylic acid in the preparation of the polyamide. This procedure results in a viscosity stable product whose terminal groups are essentially all amino or all carboxy groups, depending upon whether the diamine or dibasic carboxylic acid is used in excess. Another method commonly used is to include a monofunctional amide-forming compound such as acetic acid in the polyamide forming reaction mixture. This procedure gives viscosity stabilized polyamides whose terminal groups are essentially unreactive alkyl groups.

Although the textile fibers obtained from polyamides of the aforedescribed type possess properties of great value, they are deficient in dyeing properties in that they have practically no affinity for basic dyestuffs. This is a disadvantage in that bright shades of color are often demanded for textile fabrics which can be obtained only with basic type dyes. In general, basic dyes are characterized by the brilliancy of the colors they produce on textile fibers, and their great tinctorial power. Thus, it is often possible to obtain full shades of color with as little as one percent of basic dyestuff.

A number of methods have been proposed to increase the affinity of polyamide fibers for basic dyes, but in general they have not proven satisfactory in practice. One such proposal has been to increase the acidification of the polymer by way of viscosity stabilizers having acidic groups. This particular approach has not been successful, heretofore, in that sufficient acidity could not be obtained without excessive sacrifice in the molecular weight and spinning performance of the resulting polymer.

A primary object of the present invention is to provide a new class polyamides and a process for preparing same.

A further object of this invention is to provide polyamides having an unusual affinity for basic dyestuffs.

A still further object of this invention is to prepare polyamides which can be spun into fibers from a melt without undergoing substantial change in viscosity.

Other objects will become apparent from the description which follows.

These objects are accomplished by heating polyamide-forming reactants in the presence of a sulfonated aromatic compound having either one or two amide-forming functional groups. In the instance where two amide-forming functional groups are present they are both capable of reacting with the same complementary amide-forming radical.

Among the materials found suitable as mono-functional aromatic agents are compounds of the general formula:

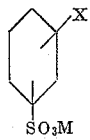

where X is a radical selected from the group consisting of RCOOH wherein R is an alkylene radical containing from 0 to 5 carbon atoms, RCOOR' wherein R is an alkylene radical containing from 0 to 5 carbon atoms and R' is an alkyl radical containing from 1 to 5 carbon atoms and $RNH_2$ where R is an alkylene radical containing from 1 to 5 carbon atoms and where M is an alkali metal. Illustrative of suitable compounds are sodium-2-carboxybenzene sulfonate, potassium-3-carboxybenzene sulfonate, sodium-3-carbomethoxybenzene sulfonate, potassium-2-carbopropoxybenzene sulfonate, sodium-2-carbomethoxyethylbenzene sulfonate, potassium-3-aminomethylbenzene sulfonate, sodium-2-aminoethylbenzene sulfonate and potassium-3-aminopropylbenzene sulfonate.

Di-functional aromatic compounds which may be suitably employed in the practice of this invention are those compounds represented by the general formula:

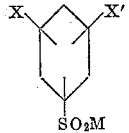

where X and X' are identical radicals selected from the group consisting of RCOOH where R is an alkylene radical containing from 0 to 5 carbon atoms, RCOOR' where R is an alkylene radical containing from 0 to 5 carbon atoms and R' is an alkyl radical containing from 1 to 5 carbon atoms and $RNH_2$ where R is an alkylene radical containing from 1 to 5 carbon atoms and where M is an alkali metal. Representative of this class of compounds are sodium-2,5- and -3,5-dicarboxybenzene sulfonate; potassium-2,5- and -3,5-dicarboxydimethylbenzene sulfonate; potassium-2,5- and -3,5-dicarboxydibutyl benzene sulfonate; potassium-2,5- and -3,5-dicarbomethoxybenzene sulfonate, sodium-2,5- and -3,5-dicarbobutoxydimethylbenzene sulfonate; potassium-2,5- and -3,5-diaminodimethylbenzene sulfonate; 2,5- and -3,5-diaminodiethylbenzene sulfonate; 2,5- and -3,5-diaminodipropylbenzene sulfonate; and 2,5- and -3,5-diaminodibutylbenzene sulfonate.

In carrying out the invention, the sulfonated compound of choice is added to the polyamide-forming composition in an amount of from about 0.25 to 2.5 molar percent, and preferably from about 0.48 to 1.5 molar percent based on the polyamide-forming composition. By a mol of the polyamide-forming composition, as applied to a diamine-dibasic acid mixture, is meant 1 mol of diamine and 1 mol of dibasic acid, in other words, 1 mol of the diamine-dibasic acid salt. By a mol of polyamide-forming composition of the amino acid type, there is meant, of course, a mol quantity of the monoaminomonocarboxylic acid reactant.

The polyamides of this invention are prepared by procedures well known in the art. That is, the reactants are heated at a temperature of from 180° C. to 300° C. and preferably from 200° C. to 295° C. until the product has a sufficiently high molecular weight to exhibit fiber-forming properties. This condition is reached when the polyamide has an intrinsic viscosity of at least 0.4 in accordance with the definition of intrinsic viscosity as given hereinabove. The reaction can be conducted at superatmospheric, atmospheric, or sub-atmospheric pressure. Often it is desirable, especially in the last stage of the reaction to employ conditions, e.g., reduced pressure, which will aid in the removal of the reaction by-products. Preferably, the reaction is carried out in the absence of oxygen, e.g., in an atmosphere of nitrogen.

In order to demonstrate the practical usefulness of the polyamides prepared in accordance with the present invention, tests were conducted comparing the affinity for basic dyes of polyamide compositions stabilized with the sulfonated compounds of this invention against polyamides stabilized by conventional means. Dyeings were made with comparable concentrations of the commercial basic dye Sevron Blue B, CI 4285. For purposes of the test, the samples were dyed in a bath maintained at a pH of 5.3–5.4 and at a temperature of 210–212° F. The dyeing time in all cases was two hours in duration.

In order to demonstrate that polymer molecular weight is not unduly sacrificed by the use of the viscosity stabilizers of this invention, comparative molecular weight determinations were taken on several of the test samples. That is, relative viscosity measurements were taken, the results of which bear a direct relationship to molecular weight. Relative viscosity is determined in a conventional Ostwald viscometer at 25° C. A solution of the polyamide is prepared in 90 percent formic acid having a concentration of 11 grams per 100 cc. solvent. The time required for a given volume of this solution to pass through the viscometer divided by the time required to pass an equal volume of solvent through the viscometer is taken as the relative viscosity of the polymer.

The following specific examples and the test data obtained therefrom are given to illustrate the invention and the advantages thereof. It is understood that the examples are by way of illustration only and are not intended to be limitative. Parts are given by weight unless otherwise indicated.

*Example I*

In this example, a polyamide was prepared from a diamine-dibasic acid salt monomer using a conventional viscosity stabilizer, i.e., an excess of dibasic acid. The purpose of this preparation was to provide a standard for comparison with the polyamides of the present invention.

A mixture of 223 grams of hexamethylenediammonium adipate, 2.48 grams of adipic acid as a viscosity stabilizer and 90 ml. of water were charged to a stainless steel autoclave. The charge and system were purged of air by alternately evacuating and filling the autoclave with nitrogen several times. The pressure and temperature were then slowly raised until values of 250 p.s.i.g. and 295° C. respectively were reached after which water was removed as condensate until the polymer melt temperature was about 240° C. At this point, the autoclave pressure was reduced at the rate of 5 p.s.i.g. each minute until atmospheric pressure was attained. The polymerization was completed by heating at atmospheric pressure for 30 minutes. The final reaction temperature was about 280° C.

The polymer was melt spun from the autoclave as undrawn single filament fibers. The melt spun fibers were then machine drawn to a draw ratio of 4.6.

*Example II*

A mixture of 223 grams of hexamethylenediammonium adipate, 2.16 grams of potassium-3-carbomethoxybenzene sulfonate, and 90 ml. of water were charged to a stainless steel autoclave. The charge and system were purged of air by alternately evacuating and filling the autoclave with nitrogen nine times. The pressure and temperature were then slowly raised until values of 250 p.s.i.g. and 295° C. respectively were reached after which water was removed as condensate until the polymer melt temperature was about 240° C. At this point, the autoclave pressure was reduced at the rate of 5 p.s.i.g. each minute until atmospheric pressure was attained. The polymerization was completed by heating at atmospheric pressure for 30 minutes. The final reaction temperature was about 280° C.

The polymer was melt spun from the autoclave as undrawn single filament fibers. The melt spinnability of the polymer was excellent with no breaks occurring in spinning at 280° C., and 100 p.s.i.g. of nitrogen pressure. After melt spinning, the fibers were machine drawn to a draw ratio of 4.1.

*Example III*

A mixture of 223 grams of hexamethylenediammonium adipate, 5.3 grams of potassium-3,5-dicarbomethoxybenzene sulfonate, and 90 ml. of water were charged to a stainless steel autoclave. The charge and system were purged of air by alternately evacuating and filling the autoclave with nitrogen nine times. The pressure and temperature were then slowly raised until values of 250 p.s.i.g. and 295° C. respectively were reached after which water was removed as condensate until the polymer melt temperature was about 240° C. At this point, the autoclave pressure was reduced at the rate of 5 p.s.i.g. each minute until atmospheric pressure was attained. The polymerization was finished by heating at atmospheric pressure for 30 minutes. The final reaction temperature was about 280° C.

The polymer was melt spun from the autoclave as undrawn single filament fibers. The melt spinnability of the polymer was excellent with no breaks occurring in spinning at 280° C., and 100 p.s.i.g. of nitrogen pressure. After melt spinning, the fibers were machine drawn to a draw ratio of 4.6.

The comparative receptives of the above examples for basic dyestuffs determined in accordance with the test as described hereinabove are given in the following table together with the results obtained on relative viscosity determinations.

| Example | Initial Basic Dye Conc., Percent (O.W.F.) | Percent Basic Dye Absorbed (O.W.F.) | Relative Viscosity of Polymer |
|---|---|---|---|
| I (Control) | 10 | 0.8 | 22.02 |
| II | 10 | 4.3 | 26.35 |
| III | 10 | 9.8 | 19.40 |

In order to further illustrate the principles and practice of the present invention, the following examples are given wherein a derivative of 6-amino-caproic acid, i.e., caprolactam was used in place of hexamethylene-diammonium adipate to prepare the polymers.

*Example IV*

A fiber-forming polyamide was prepared in the conventional manner, i.e., without employing any of the sulfonated compounds of this invention. The purpose of this preparation was to provide a standard for comparison.

A charge consisting of 60 grams of caprolactam and 26 ml. of water was placed in a small stainless steel autoclave. After air was removed from the system by means of a nitrogen purge, the pressure and temperature was raised over a period of 50 minutes to values of 250 p.s.i.g. and 250° C., respectively. At this point, the autoclave pressure was reduced at the rate of 25 p.s.i.g. every 9 minutes until atmospheric pressure was reached, during which time water was removed from the polymer as condensate. The pressure was then further reduced over a period of approximately 35 minutes to a value of 100 mm. of mercury where it was held for approximately 18 minutes. The polymerization was completed by bringing the pressure back to atmospheric.

The polymer was melt spun as undrawn single filament fibers, and showed excellent melt spinning characteristics. The melt spun fibers were then machine drawn to a ratio of 4.5.

*Example V*

A charge consisting of 60 grams of caprolactam, 3.07 grams of potassium-3,5-dicarboxybenzene sulfonate and 20 ml. of water was placed in a small stainless steel autoclave equipped with a mechanical stirrer. Air was removed from the system by means of a nitrogen purge. The pressure and temperature on the charge was then brought to 250 p.s.i.g. and 250° C. respectively, over a period of approximately 50 minutes. At this point, the autoclave pressure was reduced at the rate of 25 p.s.i.g. every 9 minutes until atmospheric pressure was reached, during which time water was removed from the polymer as condensate. The pressure was then reduced further over a period of approximately 35 minutes to a value of 100 mm. of mercury where it was held for approximately 18 minutes. The pressure was brought back to atmospheric to complete the polymerization.

The polymer was melt spun as undrawn single filament fibers, and showed excellent melt spinning characteristics. The melt spun fibers were then machine drawn to a ratio of 4.5.

The table below shows the results obtained from a comparative testing of the above examples for basic dye receptivity in accordance with the procedure as previously noted herein.

| Example | Initial Basic Dye Conc., Percent (O.W.F.) | Percent Basic Dye Absorbed (O.W.F.) |
|---|---|---|
| IV (Control) | 16 | Negligible |
| V | 16 | 10.7 |

It will be apparent from the foregoing examples and the data given in connection therewith that the polyamides obtained in accordance with this invention are markedly superior in affinity for basic dyes when compared with conventional, unmodified polyamides. Illustrative examples of basic dyes which can be employed to greater advantage with products obtained from the polyamides of this invention are Sevron Blue B, CI 4285; Tertrophene Yellow O, CI 49005; Sevron Yellow R, CI 48055; Victoria Green S, CI 42000; Brilliant Green B, CI 42040; Basolan Brilliant Red, CI 45170 and Sevron Brilliant Red, CI 48015.

The novel and improved polyamides of this invention are of primary interest in the preparation of yarns and fabrics. However, they can also be used in other applications to which synthetic linear polyamides have been put, e.g., bristles, films and the like. They are of particular value in uses where an enhanced receptivity for basic dyestuffs is desired.

The polyamides of this invention can be used in conjunction with other polyamides and/or in conjunction with delusterants, antioxidants and other modifying agents.

As many apparently widely different embodiments of this invention may be made without departing from the spirit and scope thereof, it is to be understood that I do not limit myself to the specific embodiments thereof except as defined in the appended claims.

I claim:

1. A fiber-forming synthetic linear polycarbonamide of the type having recurring amide groups as an integral part of the main polymer chain, and wherein said groups are separated by at least 2 carbon atoms, which comprises the product obtained by reacting a polyamide-forming composition selected from the group consisting of (A) a polymerizable monoaminomonocarboxylic acid of the general formula R—NH—R′—COOH in which R is a univalent hydrocarbon radical or hydrogen and R′ is a divalent hydrocarbon radical having a chain length of at least five carbon atoms, and (B) substantially equimolecular proportions of a dibasic carboxylic acid of the general formula HOOCHRCOOH in which R is a divalent hydrocarbon radical having a chain length of at least two carbon atoms and a diamine of the general formula $NH_2CH_{2n}$ in which $n$ is an integer of from 2 to 8 with from about 0.25 to 2.5 molar percent based on said polyamide-forming composition of an aromatic compound of the general formula:

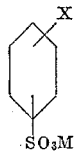

where $n$ is an integer of from 1 to 2; X represents an amide-forming radical selected from the group consisting of COOH, RCOOH wherein R is an alkylene radical containing from 1 to 5 carbon atoms, COOR where R is an alkyl radical containing from 1 to 5 carbon atoms, RCOOR' where R is an alkylene radical containing from 1 to 5 carbon atoms and R' is an alkyl radical containing from 1 to 5 carbon atoms, and $RNH_2$ where R is an alkylene radical containing from 1 to 5 carbon atoms; and wherein M is an alkali metal.

2. The fiber-forming synthetic linear polycarbonamide as set forth in claim 1 wherein said polyamide-forming composition consists of 6-amino-caproic acid.

3. The fiber-forming synthetic linear polycarbonamide as set forth in claim 1, wherein said polyamide-forming composition consists of substantially equimolecular proportions of adipic acid and hexamethylenediamine.

4. The fiber-forming synthetic linear polycarbonamide as set forth in claim 1, wherein said aromatic compound is potassium-3-carbomethoxybenzene sulfonate.

5. The fiber-forming synthetic linear polycarbonamide as set forth in claim 1, wherein said aromatic compound is potassium-3-carboxybenzene sulfonate.

6. The fiber-forming synthetic linear polycarbonamide as set forth in claim 1, wherein said aromatic compound is sodium-2-aminomethylbenzene sulfonate.

7. A textile fiber comprising the polycarbonamide as defined in claim 1.

8. A process for making fiber-forming synthetic linear polycarbonamides with improved receptivity for basic dyestuffs which comprises reacting at an elevated temperature a polyamide-forming composition selected from the group consisting of (A) a polymerizable monoamino-monocarboxylic acid of the general formula

R—NH—R'—COOH in which R is a univalent hydrocarbon radical or hydrogen and R' is a divalent hydrocarbon radical having a chain length of at least five carbon atoms, and (B) substantially equimolecular proportions of a dibasic carboxylic acid of the general formula HOOCRCOOH in which R is a divalent hydrocarbon radical having a chain length of at least two carbon atoms and a diamine of the general formula $NH_2CH_{2n}NH_2$ in which $n$ is an integer of from 2 to 8 with from about 0.25 to 2.5 molar percent based on said polyamide-forming composition of an aromatic compound of the general formula:

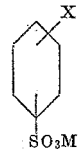

where $n$ is an integer of from 1 to 2; X represents an amide-forming radical selected from the group consisting of COOH, RCOOH wherein R is an alkylene radical containing from 1 to 5 carbon atoms, COOR where R is an alkyl radical containing from 1 to 5 carbon atoms, RCOOR' where R is an alkylene radical containing from 1 to 5 carbon atoms and R' is an alkyl radical with from 1 to 5 carbon atoms, and $RNH_2$ where R is an alkylene radical containing from 1 to 5 carbon atoms; and wherein M is an alkali metal.

9. The process set forth in claim 8 in which said polyamide-forming composition consists of 6-aminocaproic acid.

10. The process set forth in claim 8 in which said polyamide-forming composition consists of substantially equimolecular proportions of adipic acid and hexamethylenediamine.

11. The process set forth in claim 8 in which said aromatic compound is potassium-3-carbomethoxybenzene sulfonate.

12. The process set forth in claim 8 in which said aromatic compound is potassium-3-carboxybenzene sulfonate.

13. The process set forth in claim 8 in which said aromatic compound is sodium-2-aminomethylbenzene sulfonate.

References Cited in the file of this patent
UNITED STATES PATENTS

| | | |
|---|---|---|
| 2,317,751 | Frohlich et al. | Apr. 27, 1943 |
| 2,378,494 | Moncrieff et al. | June 19, 1945 |
| 2,473,924 | Walker | June 21, 1949 |
| 2,925,397 | Hopfner et al. | Feb. 16, 1960 |
| 3,039,990 | Huffman | June 19, 1962 |